Jan. 6, 1931.    E. V. SCHULTZ    1,787,999
GREASING DEVICE
Filed May 6, 1929

Inventor
Eugene V. Schultz
By his Attorneys
Williamson & Williamson

Patented Jan. 6, 1931

1,787,999

UNITED STATES PATENT OFFICE

EUGENE V. SCHULTZ, OF BOWBELLS, NORTH DAKOTA

GREASING DEVICE

Application filed May 6, 1929. Serial No. 360,975.

This invention relates to grease nozzles and to combination wrenches and grease nozzles capable of use particularly in connection with the greasing of roller shafts for endless tread chain tractors.

In tractors of the endless tread chain type, the tread chains usually run over rollers journaled on shafts bored for lubricating purposes. The bores in these shafts are usually closed by screw threaded plugs or caps when in use, to prevent the entrance of dirt into the bores of the shafts. To supply grease to these roller shafts, the plugs at the ends of the shafts must be first unscrewed, whereupon a grease nozzle must be screwed into the open ends of the shafts before grease can be forced from a grease hose into the bores of the shafts. After a shaft has been greased, the grease nozzle must be unscrewed from the shaft and the plug for the open end of the shaft, must then be screwed back in place. It is a long and tedious process to grease these shafts by methods now employed, and although attempts have been made to substitute various types of spring pressed valves for the grease closure plugs now used on these shafts, such valves have not proved successful in practice.

It is, accordingly, the object of the present invention to provide a novel and improved tool wherein a speed wrench and grease nozzle are combined for use in quickly removing grease plugs, for applying grease to members to be greased and for replacing the grease plugs after the greasing has been done in practically a continuous operation.

To this end, the invention consists in the novel parts and novel combinations of parts, hereinafter defined in the claims and described in the following specification, made in connection with the accompanying drawings, wherein like reference characters refer to the same or similar parts throughout the various views, and, in which, Fig. 1 is a view in side elevation illustrating an embodiment of the present invention in working position for use in greasing a roller shaft of an endless tread chain tractor;

Figure 4:
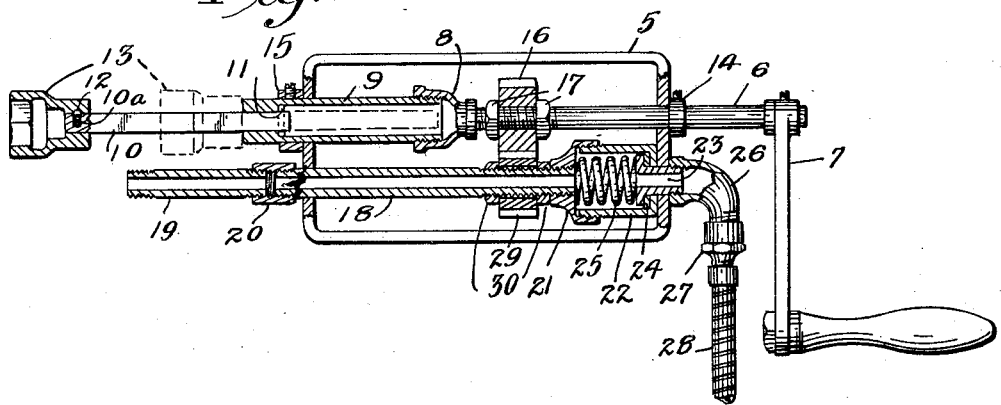
Figure 2:
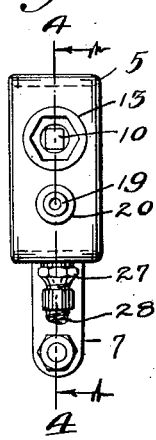
Fig. 2 is an inner end elevation of the device shown in Fig. 1.
Figure 3:
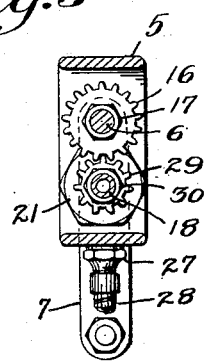
Fig. 3 is a section taken on the line 3—3 of Fig. 1, as indicated by the arrows and, Fig. 4 is a view taken chiefly in section on the line 4—4 of Fig. 2, as indicated by the arrows.

In accordance with the present invention, a suitable supporting frame designated by the numeral 5 is provided, which frame as shown in the drawings, may be of rectangular shape and is preferably of greater length than height. Journaled in the rear end of the frame 5 is a shaft 6 carrying at its rear end outwardly from the frame 5, a hand crank 7. The forward end of the shaft 6 is screw threaded and carries thereon a cap coupling 8 to which a tube 9 is secured, the tube 9 being journaled in the forward end of the frame 5 and having a polygonal-shaped opening of less diameter than the main bore of the tube at its forward end. A polygonal shaped bar 10 projects through the polygonal shaped opening at the forward end of the tube 9 and is adapted to be telescoped rearwardly within the tube 9, or to be extended forwardly therefrom, the forward extension of the bar being limited by a stop pin 11 carried at the rear end of the bar within the bore of the tube 9. The bar 10 at its forward end has a small recess 10a formed therein within which a spring pressed ball 12 is seated. A socket 13, or other suitable tool, adapted to be used for engagement with an oil plug is detachably mounted on the forward end of the bar 10, the spring pressed ball 10 being adapted to engage a recess in the shank of the socket or similar tool, to prevent the undesired removal of the socket or similar tool. The shaft 6 and tube 9 connected thereto, are held from lateral movement on the frame 5 as by means of collars 14 and 15. Secured to the screw threaded portion of the shaft 6 adjacent the center of the frame 5, is a pinion 16 held from removal on the shaft by means of jamb nuts 17.

A pipe 18 is journaled in the forward end of the frame 5 and preferably extends parallel with the shaft 6. A nozzle 19 screw threaded at its forward end is detachably secured to the forward end of the pipe 18 as by a suitable fitting 20. The pipe 18 extends rearwardly from the forward end of the frame 5 and is screw threaded at its rear end and has secured thereto a cap coupling 21 secured to the forward end of a cylindrical cup 22 bearing at its rear end against the rear end of the frame 5. An opening is provided through the rear end of the cup 22 and the rear end of the frame 5 and a nipple 23 projects through these two openings from the cup 22 and has a flange within the cup bearing against a washer 24 interposed between the flange of the nipple and the rear end of the cup 22. A coiled pressure spring 25 situated within the cup 22 reacts between the coupling 21 and the forward end of the nipple 23. The rear end of the nipple is screw threaded and a pipe fitting 26 is secured to the same rearwardly from the frame 5. A suitable coupling 27 connects the fitting 26 to a grease hose 28 preferably of the flexible armoured cable type, to withstand pressure. The grease hose 28 will run to some suitable source of grease supply (not illustrated), such as to a pressure grease gun. A gear 29 mounted on the screw threaded portion at the rear end of pipe 18 is held thereon as by jamb nuts 30 and the pinion 16 meshes with the gear 29. The pipe fitting 26 will prevent lateral movement of the pipe 18 and parts associated therewith in frame 5 in a forward direction, while the cup 22 will prevent lateral shifting movement of the shaft 18 and parts associated therewith in a rearward direction. The spring 25 bearing against the nipple 23 and forcing the same against the washer 24 prevents the leakage of grease through the opening at the rear end of the cup 22 as the pipe 18, cap coupling 21 and cup 22 are rotated relative to the nipple 23, pipe fitting 26, coupling 27 and hose 28.

Figure 1:
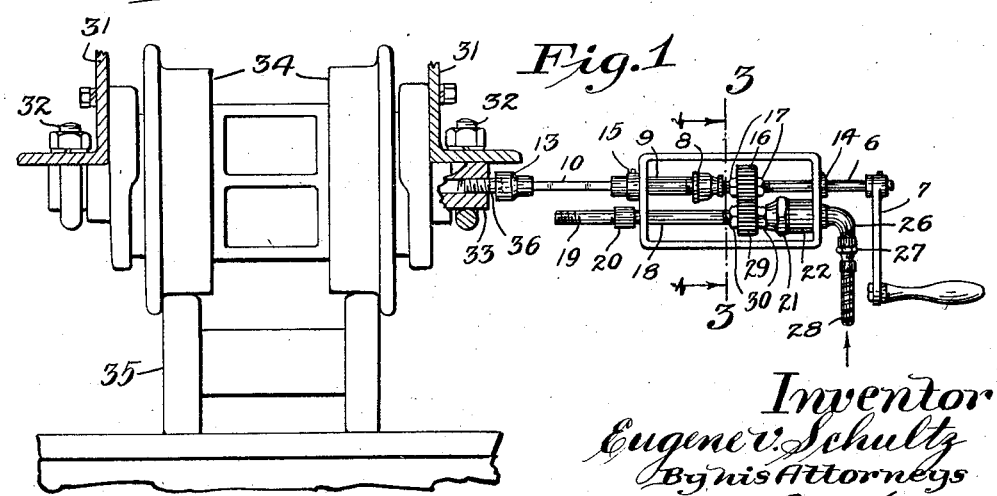

To illustrate the use of the present device, parts of a tread chain tractor are shown in Fig. 1. To angle iron frame members of the tractor are designated by the numeral 31 and these frame members carry U-clips 32 within which bored shafts 33 are mounted. The rollers 34 over which the links 35 of the tread chain run are mounted on the shafts 33 and the shafts 33 are bored in order that grease may be supplied to the rollers 34 as they rotate on the shafts. The shaft 33 is illustrated as having its bore threaded at its outer end and a screw threaded plug 36 is screwed in place in the bore at the outer end of the shaft 33. To supply grease to the bore of the shaft 33, the plug 36 must first be unscrewed, whereupon a grease nozzle must be screwed into the bore. Grease can then be supplied under pressure through the grease nozzle, whereupon the grease nozzle must be unscrewed from the bore in the shaft and then the plug 36 must be screwed back in place. All this work can be done with the present device in practically a continuous operation. The device will be preferably first situated as shown in Fig. 1 with the bar 10 extended forwardly from the tube 9 to a position where it projects beyond the nozzle 19. The socket 13 or other similar tool provided to properly engage the head of the plug 36, may then be engaged with the plug, whereupon by rotation of the crank 7 in a counter clockwise direction the plug 36 may be unscrewed from the shaft 33. The bar 10 may then be telescoped rearwardly within the tube 9, whereupon the nozzle 19 may be applied to the outer end of the shaft 33, and the nozzle can be quickly screwed in place in the screw threaded bore of the shaft 33 by continuing to turn the crank 7 in a counter clockwise direction. The pipe 18 and cup 22 will turn relative to the grease hose 28 during this movement and there will thus be no torsional strain placed on the grease hose 28. Grease may then be forced under pressure through the hose 28, coupling 27, fitting 26, nipple 23, cup 22, pipe 18, fitting 20 and nozzle 19 into the bore of the shaft 33. After the shaft has been sufficiently lubricated, the nozzle 19 may be readily unscrewed from the shaft by merely turning the crank 7 in a clockwise direction, whereupon the bar 10 may be again forwardly extended and the plug 36 may be engaged in the socket 13, or similar tool, and screwed back in place in the bore of the shaft 33 by continuing to rotate the shaft 7 in a clockwise direction. In this manner, all the roller shafts in an endless tread chain tractor can be very quickly lubricated.

Although the device is described in connection with its use for greasing the roller shafts of endless tread chain tractors, it will be understood that the device can be used for removing liquid plugs and supplying liquid of various types wherever desired. Various types of nozzles may be substituted for the nozzle 19 to suit the various requirements of the device, and various types of tools may be substituted for the socket 13 to fit plugs or caps of various types.

This device has been amply demonstrated in actual practice and has been found to be very successful for the purposes intended. The parts are few and the construction is simple.

It will, of course, be understood that various changes may be made in the form, details, arrangement and proportions of the various parts without departing from the scope of the present invention.

What is claimed is:

1. A combination wrench and grease nozzle comprising, a suitable supporting frame, a shaft journaled in said frame, means for turning said shaft, an extensible plug engaging wrench mounted at the forward end of said shaft, a pipe journaled in said frame, means for coupling a grease supply hose or the like to the rear end of said pipe, said pipe having a portion at its forward end adapted to be engaged in an oil plug opening when said pipe is rotated in one direction and to be disengaged therefrom when said pipe is rotated in an opposite direction, and means for rotating said pipe as said shaft is turned, whereby said wrench may be extended from said shaft and engaged with an oil plug to permit the removal thereof when said shaft is rotated and then said wrench may be withdrawn from extended position and said pipe may be quickly engaged with the member from which the oil plug is removed.

2. A combination speed wrench and grease nozzle comprising a suitable frame, a shaft journaled in said frame, a bar extensible therefrom, a socket secured to said bar for engagement with an oil plug, a pinion mounted on said shaft, a rotatable pipe journaled in said frame, a nozzle on the forward end of said pipe, said nozzle having a portion adapted to be engaged in an oil plug opening when said pipe is rotated in one direction and to be disengaged therefrom when said pipe is rotated in an opposite direction, a gear mounted on said pipe and meshing with said pinion, means for coupling a grease hose to said pipe and a crank for turning said shaft.

3. A greasing device comprising, a suitable supporting frame, a pipe journaled in said frame, a detachable nozzle secured to the forward end of said pipe and having a screw thread at its outer end for engagement with a member to be greased, means for coupling said pipe at its rear end to a non-rotatable grease hose, a shaft mounted in said frame, a pinion on said shaft, a gear on said pipe meshing with said pinion and a crank for rotating said shaft.

4. A greasing device comprising, a suitable supporting frame, a shaft journaled in said frame, a bar extensible from the forward end of said shaft, a socket secured to the forward end of said bar, a crank secured on the rear end of said shaft, a pipe journaled in said frame and extending parallel to said shaft, said pipe having a screw threaded nozzle at its forward end for engagement with a member to be greased, means for coupling said pipe at its rear end to a non-rotatable grease hose, a pinion on said shaft and a gear on said pipe in mesh with said pinion.

In testimony whereof I affix my signature.

EUGENE V. SCHULTZ.